United States Patent [19]

Raiburn

[11] 4,244,430

[45] Jan. 13, 1981

[54] EARTH BORING BIT PACKED LUBRICATION SYSTEM

[75] Inventor: Glen D. Raiburn, Plano, Tex.

[73] Assignee: Dresser Industries, Inc., Dallas, Tex.

[21] Appl. No.: 75,350

[22] Filed: Sep. 13, 1979

Related U.S. Application Data

[63] Continuation of Ser. No. 939,527, Sep. 5, 1978, abandoned.

[51] Int. Cl.³ .................... E21B 10/22; B21K 5/04
[52] U.S. Cl. .................... 175/227; 76/108 R; 175/371; 308/8.2
[58] Field of Search .................... 175/227–229, 175/371, 372; 308/8.2; 76/108 A, 108 R

[56] References Cited

U.S. PATENT DOCUMENTS

| | | | |
|---|---|---|---|
| 3,361,494 | 1/1968 | Galle | 175/369 X |
| 3,384,426 | 5/1968 | Schumacher et al. | 308/8.2 |
| 3,746,405 | 7/1973 | Welton | 308/8.2 |
| 3,844,363 | 10/1974 | Williams | 175/371 X |
| 3,890,018 | 8/1975 | Clamon | 308/8.2 |
| 4,010,985 | 3/1977 | Rear | 308/8.2 |
| 4,019,785 | 4/1977 | Stinson et al. | 308/8.2 |
| 4,061,376 | 12/1977 | Villaloboz | 308/8.2 |

Primary Examiner—Ernest R. Purser
Attorney, Agent, or Firm—Eddie E. Scott; Fred A. Winans

[57] ABSTRACT

A rolling cone cutter earth boring bit is provided with an improved lubrication system including an eccentric bearing surface and spaces for lubricant. At least one cantilevered bearing pin extends from the arm of the bit. A rolling cone cutter is rotatably mounted on the bearing pin. The outer bearing surface of the bearing pin is provided with a pair of grooves. The unloaded side surface of the outer bearing surface is formed by eccentric machining. Reduced clearance is provided between the rolling cone cutter and the load side surface and increased clearance is provided between the rolling cone cutter and the unloaded side surface. The pair of grooves and the increased clearance serve as a lubricant reservoir in close proximity to the load side of the bearing pin.

2 Claims, 2 Drawing Figures

:::: {.page}
EARTH BORING BIT PACKED LUBRICATION SYSTEM

This is a continuation, of application Ser. No. 939,527, filed Sept. 5, 1978 and now abandoned.

TECHNICAL FIELD

The present invention relates in general to the art of earth boring, and more particularly, to a rotary rock bit with an improved lubrication system. The present invention is especially adapted for use on that type of rotary rock bit popularly known as a three cone bit.

BACKGROUND OF THE INVENTION

A three cone rotary rock bit is adapted to be connected as the lower member of a rotary drill string. As the drill string is rotated the bit disintegrates the earth formations to form an earth borehole. The three cone rotary rock bit includes three individual arms that extend angularly downward from the main body of the bit. The lower end of each arm is shaped to form a bearing pin or journal. A rolling cone cutter is mounted upon each bearing pin (or journal) and adapted to rotate thereon. The cone cutters include cutting structure on their outer surface that serves to disintegrate the formations as the bit is rotated.

A rotary rock bit must operate under very severe environmental conditions and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cone cutters thereby providing a longer useful lifetime for the cutters. This has resulted in the bearing and lubrication system being generally the first to fail during the drilling operation. Consequently, a need exists for an improved lubrication system to extend the useful lifetime of the bit.

DESCRIPTION OF PRIOR ART

In U.S. Pat. No. 3,746,405 to Russell L. Welton, a well drilling bit lubrication system and seal is shown. A journal bearing lubrication means and a seal cooperatively combined therewith to maintain lubrication throughout the useful life of the roller cutter of a well drilling bit, to the exclusion of foreign materials entering therein from the drilling fluids and surrounding earth formations. A journal bearing of right cylinder form is provided, characterized by the formation of a strategically placed recess or recesses therein and all without subtracting from the load carrying capabilities of the bit, the assembly being retained in working condition by a single element combined with the lubrication means and assuring proper axial placement of the roller cutter.

In U.S. Pat. No. 3,890,018 to Robert D. Clamon, a rotary rock bit with a wiper pad lubrication system is shown. A system is provided for circulating lubricant into the loaded contact area between the bearing pin and the rotating cutter of an earth boring bit. The cutter is mounted to rotate about the bearing pin. The cutter includes a cutter interior surface. At least one wiper pad cavity is located in the aforementioned interior surface of the cutter. A wiper pad is positioned in the wiper pad cavity and a resilient member is positioned beneath the wiper pad. As the cutter rotates, the wiper pad forces lubricant into the load area between the bearing pin and the interior surface of the cutter.

In U.S. Pat. No. 4,061,376 to Arthur A. Villaloboz, a rock bit bearing structure is shown. A rock bit has a rotary cutter cone journaled on a fixed journal bearing shaft with the radial load being taken by a cylindrical journal bearing. The friction bearing portion of the fixed shaft has a groove extending around the periphery of the shaft. The groove is filled with a bearing metal over an arc on the lower load bearing fraction of the shaft. The remaining unfilled portion of the groove is connected through a lubricant supply passage in the bit body with a pressure-compensated grease reservoir in the bit body to supply lubrication to the journal bearing.

SUMMARY OF THE INVENTION

The present invention provides a rolling cutter earth boring bit with an improved lubrication system including space for lubricant. At least one cantilevered bearing pin extends from the body of the bit. A rolling cone cutter is rotatably mounted on the bearing pin. Reduced clearance is provided between the cone cutter and the bearing pin, enabling the load to be distributed over a greater area. The unloaded portion of the bearing pin includes at least one groove to enhance distribution of lubricant. The unloaded portion of the bearing pin includes an eccentrically ground section that provides lubricant storage for longer bearing life. The above and other objects and advantages of the present invention will become more apparent from a consideration of the following detailed description of the invention when taken in conjunction with the drawings.

DETAILED DESCRIPTION OF THE INVENTION

Figure 1:
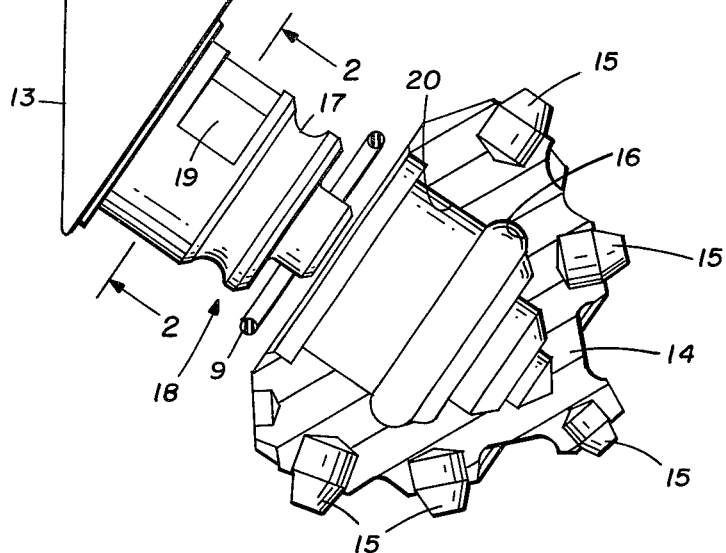
FIG. 1 illustrates one arm of a rotary rock bit constructed in accordance with the present invention.

Referring now to the drawings and to FIG. 1 in particular, illustrated therein and generally designated by the reference number 10 is a three cone sealed bearing rotary rock bit. The bit 10 includes a bit body 11, including an upper threaded portion 12. The threaded portion 12 allows the bit 10 to be connected to the lower end of a rotary drill string (not shown). Depending from the bit body 11 are three substantially identical arms with only the arm 13 being shown in FIG. 1. The lower end of each of the arms is provided with an extended bearing pin comprising a journal portion and the details of this journal portion will be discussed subsequently. Three rotary cone cutters are rotatably positioned on the three bearing pins extending from the arms. The cutter 14 is shown in FIG. 1. Each of the cutters includes cutting structure on its outer surface adapted to disintegrate formations as the bit 10 is rotated and moved downward. The cutting structure is shown in the form of tungsten carbide inserts 15. However, it is to be understood that other cutting structures such as steel teeth may be used as the cutting structure on the cone cutters.

The bit 10 includes a central passageway extending along the central axis of body 11 to allow drilling fluid to enter from the upper section of the drill string (not shown) immediately above and pass downward through jet nozzles past the cone cutters. In use, the bit 10 is connected as the lower member of a rotary drill string (not shown) and lowered into the well bore until the cone cutters engage the bottom of the well bore. Upon engagement with the bottom of the well bore, the drill string is rotated, rotating bit 10 therewith. Drilling fluid is forced down through the interior passage of the rotary drill string by mud pumps located at the surface. The drilling fluid continues through the central passageway of the bit 10, passing through the nozzles past the cutting structure of the cutters to the bottom of the well bore, thence upward in the annulus between the rotary drill string and the wall of the well bore, carrying with it the cuttings and debris from the drilling operation.

The bearing system of the bit must insure free rotation of the cone cutters under the severe drilling environmental conditions. The elongated lower portion of arm 13 forms the bearing pin 18 comprising a journal portion. The rotatable cutter 14 is mounted upon the journal portion. The bearing system of the present invention insures free rotation of rotatable cutter 14 under the severe drilling conditions. A series of ball bearings (not shown) that bridge between raceways 16 and 17 insure that rotatable cutter 14 is rotatably locked on bearing pin 18. The rotatable cutter 14 is positioned upon journal 18 and the series of ball bearings are inserted through a bore extending into arm 13. After the ball bearings are in place, a plug is inserted in the bore and welded therein. A flexible seal 9 forms a seal between cutter 14 and bearing pin 18 to prevent loss of lubricant or contamination of the lubricant from materials in the well bore.

Figure 2:
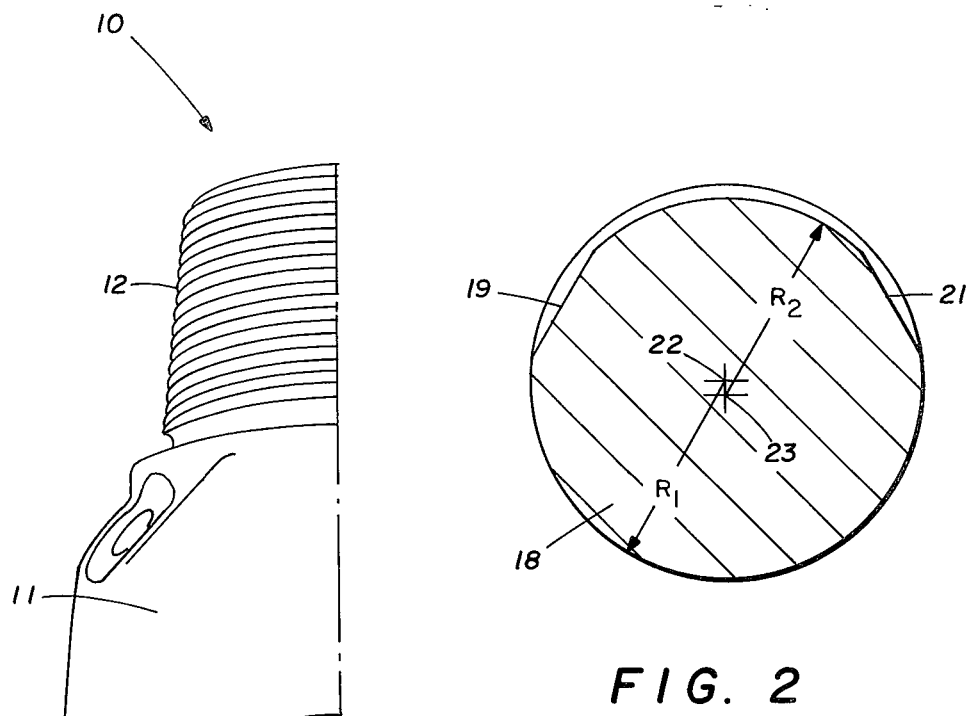
FIG. 2 is a sectional view of the bearing pin of the bit shown in FIG. 1.

Referring now to FIG. 2, a sectional view of bearing pin 18 taken along lines 2—2 of FIG. 1 is shown. The grooves 19 and 21 are cut in the journal portion of bearing pin 18. The central axis 23 of the load side of the bearing pin 18 and the central axis 22 of the unloaded side of the bearing pin 18 are offset. The unloaded surface 21 is eccentric to the bearing pin 18. A space for lubricant is thereby provided on the upper unloaded side of the bearing pin 18. The eccentrically ground journal provides greater lubricant storage area for longer bearing life.

The structural details of an earth boring bit 10 of the present invention having been described, the contruction of the bit 10 will now be considered with reference to FIGS. 1 and 2. The grooves 19 and 20 are cut in the journal portion of bearing pin 18. The grinding or machining of the load side and unloaded side of the journal is accomplished about axes 22 and 23 respectively. This provides a radius $R_1$ for the load side of the journal and a radius $R_2$ for the unloaded side of the journal. The radii $R_1$ and $R_2$ may be equal, however, it is to be noted that the axes 22 and 23 of radii $R_1$ and $R_2$ respectively are offset. The foregoing provides reduced clearance between the cone cutter and the journal, enabling the load to be distributed over a greater area. The unloaded portion of the journal is provided with greater clearance to enhance distribution of the lubricant.

The embodiments of an invention in which an exclusive property or privilege is claimed are defined as follows:

1. A method of constructing a rotary rock bit, comprising:
   providing a cantilevered bearing pin on said bit, said bearing pin having a central axis, a top and a bottom; providing an unloaded surface on the top of the bearing pin by forming said unloaded surface about a radius offset from said central axis thereby leaving said unloaded surface slightly eccentric to the bearing pin;
   providing at least one groove in the unloaded surface;
   providing a load surface on the bottom of said bearing pin by forming said load surface about a radius concentric with said central axis; and
   positioning a rotary cone cutter on said bearing pin with substantial clearance between said unloaded surface of said bearing pin and said rotary cone cutter and reduced clearance between said load surface of said bearing pin and said rotary cone cutter.

2. A rolling cutter earth boring bit, comprising:
   a bit body, said bit body having at least one downwardly extending arm with a projecting bearing pin, said bearing pin having a central axis, a top and a bottom;
   a rolling cone cutter adapted to be rotatably mounted on said bearing pin;
   bearing and cutter retaining means between said bearing pin and said rolling cone cutter;
   a seal positioned around said bearing pin between said bearing pin and said rolling cone cutter;
   an eccentric unloaded surface on the top of said bearing pin that extends radially about a location offset from said central axis of said bearing pin with a space existing between said rolling cone cutter and said unloaded surface;
   at least one groove in said eccentric unloaded surface;
   a concentric load surface on the bottom of said bearing pin that extends radially about a location concentric with said central axis of said bearing pin with reduced clearance between said rolling cone cutter and said load surface; and
   a lubricant located between said rolling cone cutter and said bearing pin, said lubricant filling said space and said at least one groove.

* * * * *